US012455050B1

(12) United States Patent
Wright et al.

(10) Patent No.: US 12,455,050 B1
(45) Date of Patent: Oct. 28, 2025

(54) LED TUBE LIGHTING DEVICE HAVING UNIFORM LIGHT DISTRIBUTION

(71) Applicant: CURRENT LIGHTING SOLUTIONS, LLC, Beachwood, OH (US)

(72) Inventors: William Wright, Russell, OH (US); Qiang Zou, ShaanXi (CN); Junxian Chu, ShaanXi (CN); Jinlin Cao, ShaanXi (CN)

(73) Assignee: CURRENT LIGHTING SOLUTIONS, LLC, Beachwood, OH (US)

(*) Notice: Subject to any disclaimer, the term of this patent is extended or adjusted under 35 U.S.C. 154(b) by 0 days.

(21) Appl. No.: 19/036,691

(22) Filed: Jan. 24, 2025

(51) Int. Cl.

| | |
|---|---|
| ***F21S 4/28*** | (2016.01) |
| ***F21K 9/272*** | (2016.01) |
| ***F21K 9/275*** | (2016.01) |
| ***F21K 9/68*** | (2016.01) |
| ***F21V 7/00*** | (2006.01) |
| ***F21V 23/02*** | (2006.01) |
| ***F21V 23/06*** | (2006.01) |
| ***F21Y 103/10*** | (2016.01) |
| ***F21Y 115/10*** | (2016.01) |

(52) U.S. Cl.
CPC ................ *F21K 9/68* (2016.08); *F21K 9/272* (2016.08); *F21K 9/275* (2016.08); *F21S 4/28* (2016.01); *F21V 7/005* (2013.01); *F21V 23/023* (2013.01); *F21V 23/06* (2013.01); *F21Y 2103/10* (2016.08); *F21Y 2115/10* (2016.08)

(58) Field of Classification Search
CPC .. F21K 9/68; F21K 9/272; F21K 9/275; F21S 4/28; F21V 7/005; F21V 23/023; F21V 23/06; F21Y 2103/10
USPC .......................................................... 362/551
See application file for complete search history.

(56) References Cited

U.S. PATENT DOCUMENTS

| | | | | |
|---|---|---|---|---|
| 9,709,224 | B2 * | 7/2017 | Jang | F21K 9/68 |
| 10,514,134 | B2 | 12/2019 | Jiang et al. | |
| 10,830,397 | B2 | 11/2020 | Jiang et al. | |
| 2007/0025119 | A1 * | 2/2007 | Chang-Jien | F21K 9/61 362/555 |
| 2010/0172149 | A1 * | 7/2010 | Siemiet | F21S 4/28 362/555 |
| 2011/0038146 | A1 * | 2/2011 | Chen | F21V 7/005 362/225 |
| 2011/0103053 | A1 * | 5/2011 | Chen | F21V 15/013 362/296.01 |
| 2013/0155646 | A1 | 6/2013 | Zhang | |
| 2020/0063925 | A1 * | 2/2020 | Zhong | F21V 31/00 |

* cited by examiner

*Primary Examiner* — Laura K Tso
(74) *Attorney, Agent, or Firm* — Buckley Maschoff & Talwalkar LLC

(57) ABSTRACT

Pursuant to some embodiments, an LED lighting device is provided that includes an elongated lamp tube, two end caps, each of the two end caps coupled to a respective end of the elongated lamp tube, an LED light bar disposed on an inner surface of the elongated lamp tube, the LED light bar having a plurality of LED light sources mounted thereon, a power source disposed on at least a first end of the lamp tube, the power source electrically connected to the plurality of LED light sources, and a reflective strip disposed on the inner surface of the elongated lamp tube in a position diametrically opposite the LED light bar.

16 Claims, 5 Drawing Sheets

LED TUBE LIGHTING DEVICE HAVING UNIFORM LIGHT DISTRIBUTION

FIELD

The present disclosure relates to lighting devices.

BACKGROUND

A number of lighting applications commonly use fluorescent lighting tubes. The tubes are mounted within a lighting device having one or more sides that are translucent to allow light to be distributed to illuminate an area. For example, in ceiling lighting applications, the light is distributed downward and to the side to illuminate a room or area (e.g., in a relatively focused beam angle). Some applications, such as signage or cabinet lighting applications, require light to be distributed with a wider beam angle (e.g., around the device, substantially 360 degrees from the axis of the lighting device). Fluorescent lighting tubes are generally able to produce such lighting.

Increasingly, these fluorescent lighting tubes are being replaced with tubular LED light emitting devices. These LED lighting devices provide excellent illumination and last far longer than standard fluorescent tubes. These LED lighting devices also use less energy than fluorescent tubes. LED lighting tube devices are often retrofitted into existing indoor lighting mounts such as ceiling or wall frames. These ceiling or wall-mounted lights require that light be directed downward or outward (e.g., emitting light in substantially less than 360 degrees). Tubular LED lighting devices are commonly designed and able to emit light with a beam angle of approximately 200 degrees making them well-suited for ceiling or wall-mounted lighting applications where a more directed light distribution is required. Unfortunately, existing LED lighting tube devices are not well-suited for lighting applications which require a wider beam angle (such as, for example, signage or cabinet lighting applications).

It would be desirable to provide LED light emitting tube devices that have a wider beam angle (e.g., up to 360 degrees) providing a more uniform light distribution. It would further be desirable to provide an adjustable LED light emitting device allowing the device to be mounted with different socket types and in different environments.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

Figure 1B:
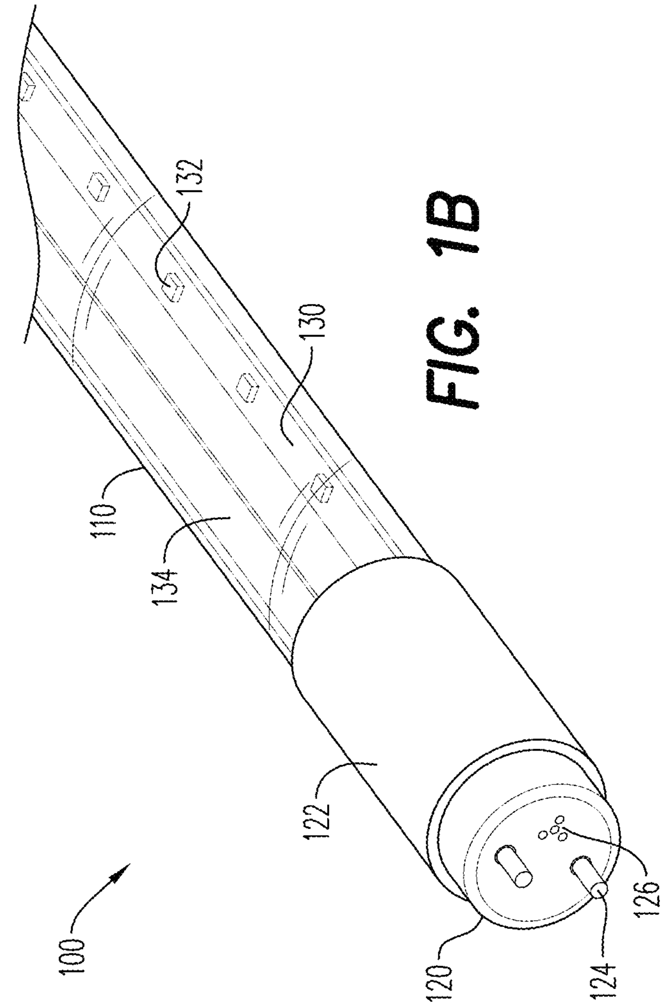
FIGS. 1A-1B are partial views of a LED lighting device pursuant to some embodiments.
Figure 1A:
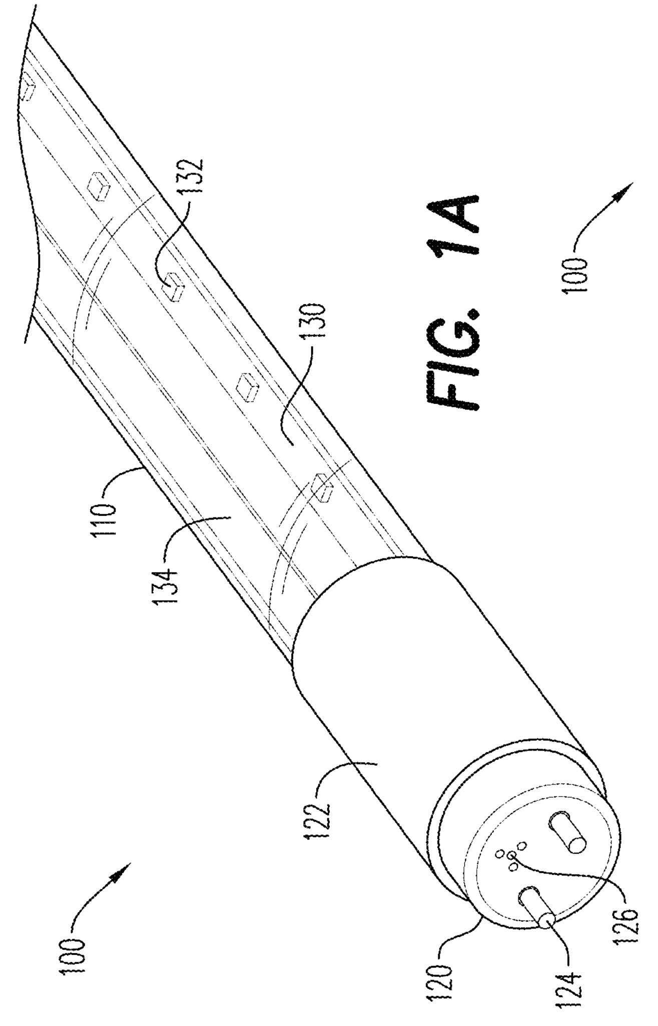

FIGS. 1A and 1B illustrate portions of an LED lighting device pursuant to some embodiments. As shown in FIG. 1A, an LED lighting device 100 includes an elongated light tube 110 that extends from an end cap 120 and an insulating sleeve 122. The elongated light tube 110 contains an LED light bar 130 and a reflective strip 134 positioned in an interior of the elongated light tube 110 and extending from the end cap 120 to another end cap (not shown in FIG. 1) positioned at a distal end of the elongated light tube 110. The LED light bar 130 may contain or house electronics to distribute power and control signals to a plurality of LED light sources 132 mounted on a face of the LED light bar 130. The elongated light tube 110 is formed as a hollow tube and may be formed of any of a number of materials known for use for light tubes in the art or to be developed for such purposes. The light tube may itself be transparent, opaque or translucent and can be used as both a tube and diffuser for LED light emitted from the LED light sources 132.

While not shown in FIG. 1, the LED lighting device 100 includes one or more operational components mounted in the ends of the elongated light tube 110 and/or within the insulating sleeve 122. For example, the components may include wiring, drivers and switches to control and provide power distribution to the LED light sources 132. The LED light bar 130 may be formed with a plurality of electric conductors and wires that deliver power to each of the LED light sources 132.

The LED light sources 132 and the wiring, drivers and switches are preferably in electrical communication. That is, they are electrically connected through conductive material to one another directly or indirectly through another electrical component and/or are each in electrical communication with connectors as described further below that are connectible to an electrical power source. In some embodiments, multiple LED light sources 132 are disposed along the LED light bar 130. The LED light sources 132 are preferably spaced uniformly The LED light sources 132 may be mounted to the LED light bar 130 using any suitable technique known or to be developed in the art. Preferably, the LED light sources 132 are mounted to the LED light bar 130 by use of surface mount technology (SMT) soldering technology. The spacing between LED light sources 132 as well as the number of LED light sources 132 used can be varied based on a desired illuminance of the LED lighting device 100 as well as the length of the elongated light tube 110.

In the embodiment shown in FIG. 1, the end cap 120 includes a pair of conductive pins 124 which are positioned to mate with an electrical socket in a light fixture in which the LED lighting device 100 is to be installed. The conductive pins 124, once inserted into a light fixture will form an electrical connection providing power to the LED lighting device. In some embodiments, as will be described further below in conjunction with FIGS. 7 and 8, the conductive pins 124 are inserted into an adapter allowing the LED lighting device 100 to be installed in other types of light fixtures (e.g., such as fixtures that do not have a connector to receive the conductive pins 124). As shown in FIG. 1, the end cap 120 may be formed with a plurality of vent holes 126 which allow heat dissipation from the operation of the LED lighting device 100.

Figure 3:
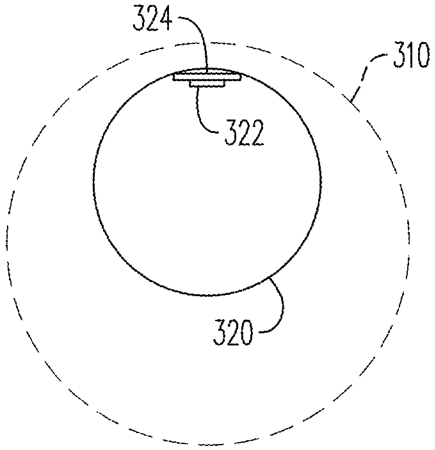
FIG. 3 (PRIOR ART)
FIG. 3 illustrates light distribution of a prior art LED lighting tube.

As shown in FIG. 1, pursuant to the present invention, a reflective strip 134 is mounted on an inner surface of the elongated light tube 110 on an opposite inner surface location from the LED light bar 130. As used herein, the term "diametrically opposite" or "diametrically opposing" will be used to describe the placement of the reflective strip 134 relative to the LED light bar 130. That is, if the elongated light tube 110 is viewed through its central axis, the reflective strip 134 and the LED light bar 130 lie 180 degrees apart around the inner circumference of the elongated light tube 130 (e.g. as shown in FIGS. 1 and 3). Applicants have found that such positioning of a reflective strip 134 achieves desirable light distribution from the LED lighting device 100 (as will be described further below).

Referring now to FIG. 1B, in some embodiments, the orientation of the LED light bar 130 and the reflective strip 134 with respect to the conductive pins 124 may be varied to satisfy different installation requirements. In FIG. 1A the conductive pins 124 are oriented and substantially parallel to the LED light bar 130 and reflective strip 134, while in FIG. 1B, the conductive pins 124 are oriented substantially perpendicular to the LED light bar 130 and reflective strip 134. In either orientation, the LED lighting device 100 exhibits a substantially 360 degree illumination profile.

Applicants have found that the width of the reflective strip 134 (in most cases) should substantially be equal to the width of the LED light bar 130. In applications where the elongated light tube 110 is shorter (e.g., such as less than or equal to four feet), the width of the LED light bar 130 may be narrower (because fewer LED light sources 132 are required for such shorter tubes, there are fewer conductive traces or wires that need to be formed on the LED light bar 130 resulting in a narrower LED light bar 130). In these shorter elongated light tubes 110, the reflective strip 134 may be slightly wider than the LED light bar 130 while providing desirable beam pattern results. Pursuant to some embodiments, the reflective strip 134 is formed of a material such as polyethylene terephthalate ("PET") or other similar durable materials that can support a reflective surface. In some embodiments, the reflective strip 134 has a thickness of approximately 0.25 mm and a reflectivity of 95%. Applicant has found that a white color and a relatively thicker thickness of the reflective strip 134 has the greatest impact on the reflectivity of the reflective strip 134. A number of desirable dimensions of the light bar and the reflective strip are shown in TABLE 1. These dimensions are selected for applications requiring a wide (e.g., 360 degree) beam angle; however, applications that require different beam angles may be achieved using dimensions different than those shown in TABLE 1.

TABLE 1

| | Light Bar | Reflective Strip (PET) | | |
|---|---|---|---|---|
| Tube | Width | Width | Thickness | Reflectivity |
| 8 ft | 15.5 mm | 15.5 mm | 0.25 mm | 95% |
| 7 ft | 15.5 mm | 15.5 mm | 0.25 mm | 95% |
| 6 ft | 15.5 mm | 15.5 mm | 0.25 mm | 95% |
| 64 in | 15.5 mm | 15.5 mm | 0.25 mm | 95% |
| 5 ft | 15.5 mm | 15.5 mm | 0.25 mm | 95% |
| 4 ft | 9.5 mm | 10.0 mm | 0.25 mm | 95% |
| 3 ft | 9.5 mm | 10.0 mm | 0.25 mm | 95% |

Applicant has found that the width of the reflective strip 134 should be equal to or greater than 80% of the width of the LED light bar 130, and the thickness of the reflective strip 134 should be greater than or equal to 0.05 mm. Further, the reflectivity of the reflective strip 134 should be greater than or equal to 80%.

Figure 2:
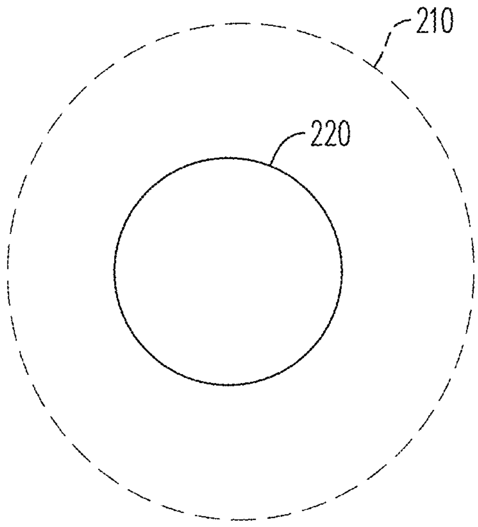
FIG. 2 (PRIOR ART)
FIG. 2 illustrates light distribution of a prior art fluorescent tube.

Reference is now made to FIG. 2 where an illustrative beam pattern 210 produced by a typical linear fluorescent tube lamp 220 is shown. As depicted, a linear fluorescent tube lamp 220 generally emits light in a uniform distribution around the fluorescent tube 220. However, a typical prior art LED tube does not emit such a uniform distribution. Referring to FIG. 3, a typical or standard LED tube 320 directs light "down" (or in a direction away from the standard LED tube 320) in a pattern 310. This is because a standard LED tube 320 places LED light sources 322 on a LED light bar 324 positioned on one side of the LED tube 320. A minimal amount of light (if any) is able to extend behind the LED light bar 324 as the LED light bar 324 blocks such light. This makes a standard prior art LED tube 320 undesirable for certain lighting applications (such as cabinet or signage applications).

Figure 4:
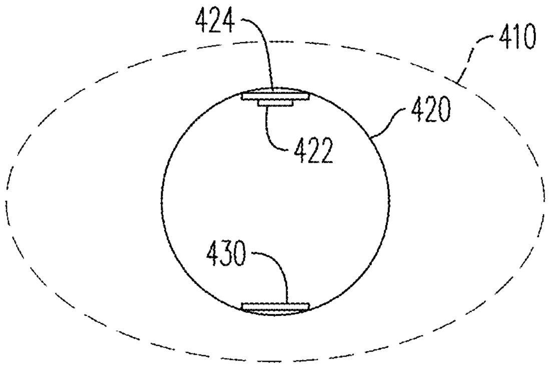
FIG. 4 illustrates light distribution of a LED lighting device pursuant to some embodiments.

Reference is now made to FIG. 4 where an illustrative beam pattern 410 produced by an LED lighting device of the present invention is shown. As depicted, the LED lighting device includes an elongated light tube 420 within which is disposed an LED light bar 424 on which are disposed a plurality of LED light sources 422. Positioned opposite the LED light bar 424 is a reflective strip 430. The light distribution 410 generated by devices of the present invention is substantially uniform, making LED lighting devices of the present invention suitable for applications such as cabinet or signage (or other applications requiring substantially uniform lighting). The reflective strip 430 serves to reflect light from the LED light sources 422 back towards the LED light bar 424 ensuring even lighting distribution around the device.

Figure 5:
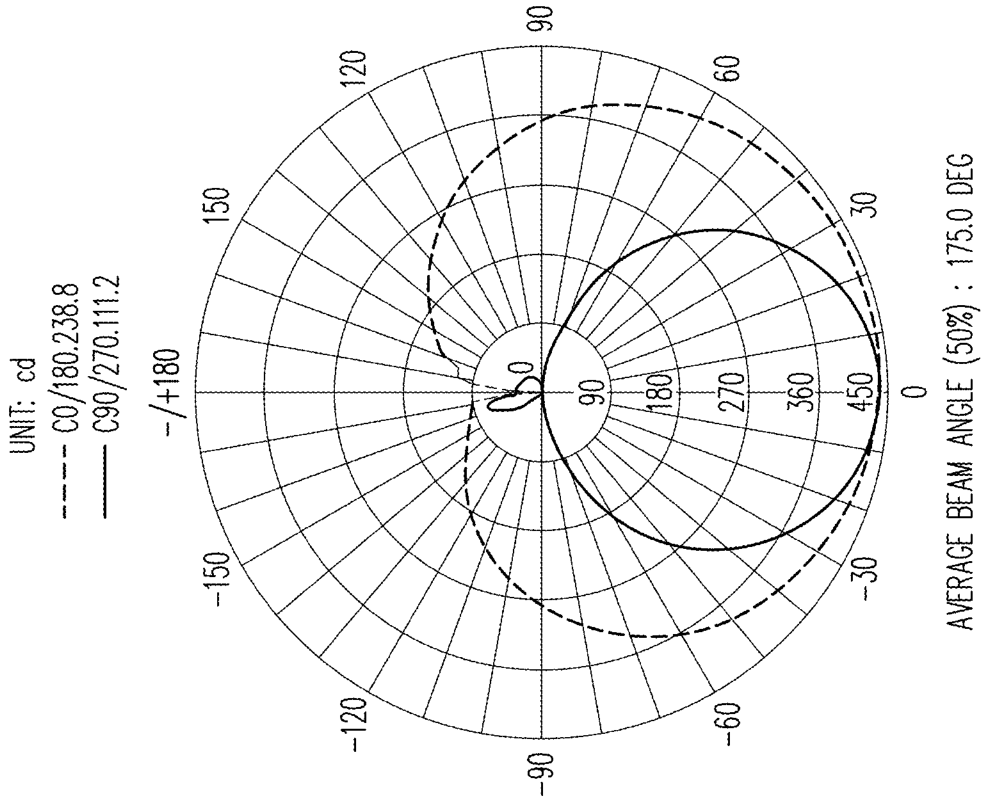
FIG. 5 (PRIOR ART)
FIG. 5 illustrates a luminous intensity distribution diagram of a prior art LED lighting tube.

Reference is now made to FIG. 5 where an illustrative beam pattern of a typical LED tube light is shown. As shown, the light distribution of FIG. 5 has an average beam angle of approximately 238.8 degrees (when viewed in the CO/180 measurement, which is the standard defined for LED tube devices by ANSI Standard C78.53-2019. This may be well suited for a ceiling mounted light (which requires illumination of an area beneath the lighting device) but is undesirable for signage or other applications requiring a wider distribution of illumination.

Figure 6:
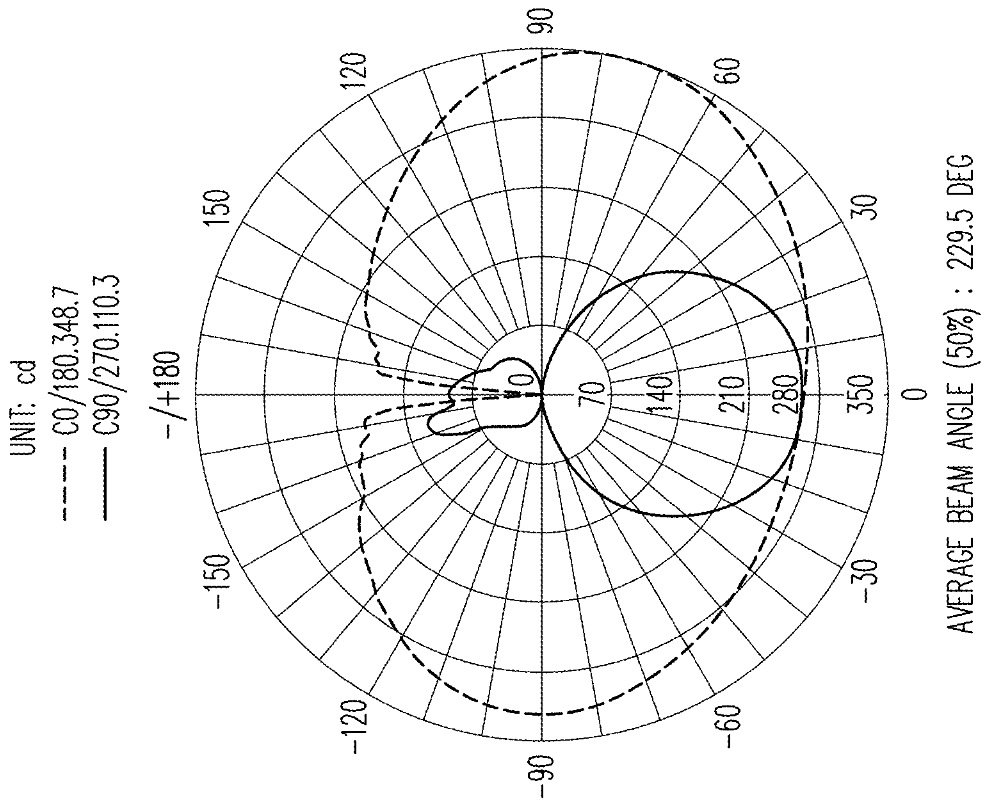
FIG. 6 illustrates a luminous intensity distribution diagram of a LED lighting device pursuant to some embodiments.

Reference is now made to FIG. 6, where an illustrative beam pattern of an LED lighting device of the present invention is shown. As shown, the light distribution pattern of FIG. 6 is substantially more uniform, having a beam angle of 348.7 degrees in the CO/180 measurement, showing that the device throws light over a very large area before the intensity halves. Such wide coverage is desirable for signage and other applications where the light distribution needs to wash or cover signage evenly.

Figure 7:
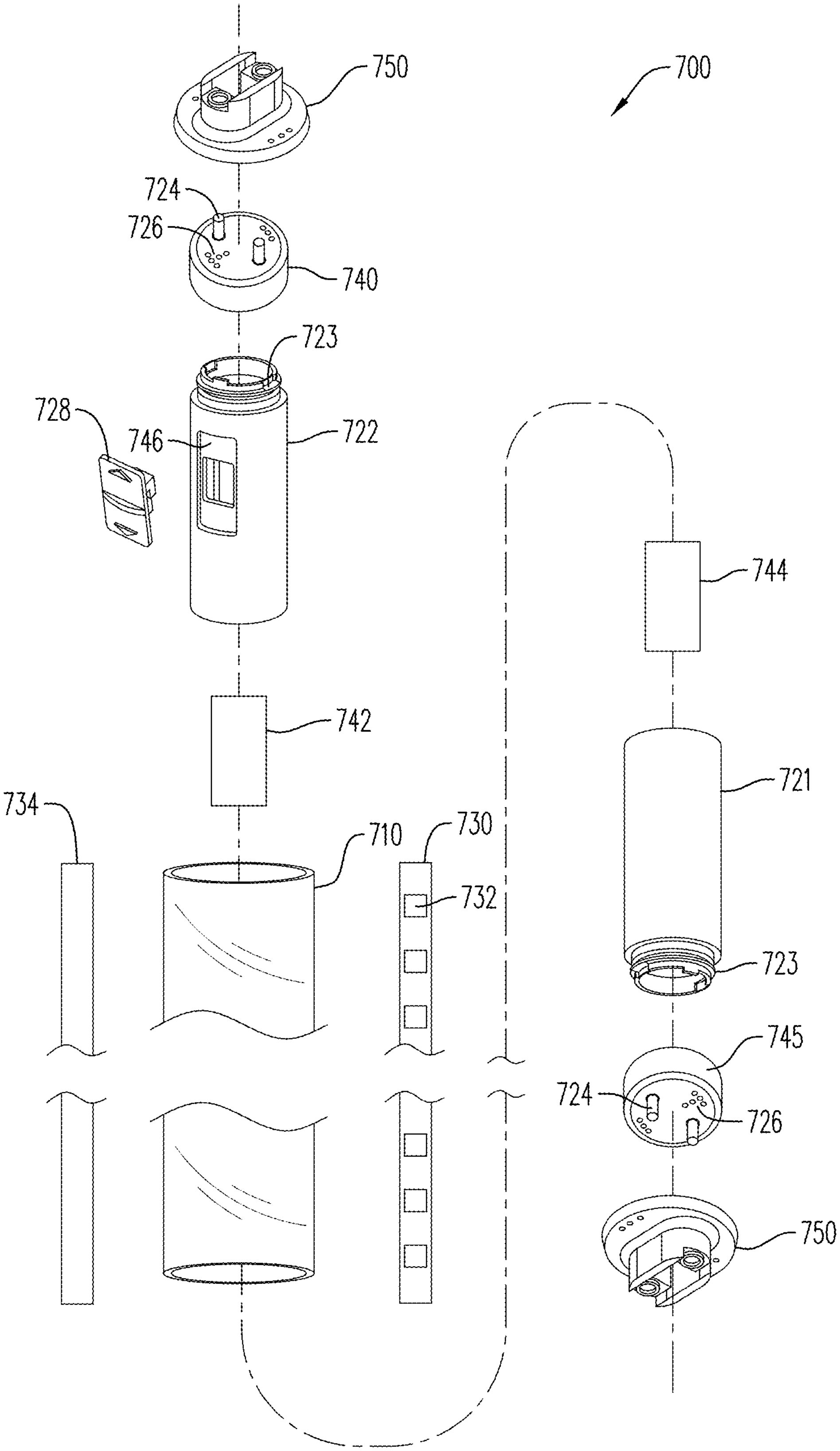
FIG. 7 illustrates an exploded view of an LED lighting device pursuant to some embodiments.

Reference is now made to FIG. 7 where details of the components of an LED lighting device 700 pursuant to some embodiments are shown in an exploded view. In the embodiment shown in FIG. 7 (as well as in FIG. 8 discussed further below) the LED lighting device 700 is shown in an embodiment having a rotatable endcap 740, and a converter 750 is mounted on the conductive pins 724 to allow the LED lighting device 700 to be mounted in certain sockets. For example, the converter 750 may be a recessed double contact base (or "R17D") bi-pin converter which converts the LED lighting device 700 for use in R17D high output sockets. Those skilled in the art, upon reading the present disclosure, will appreciate that the LED lighting device 700 may be used with or without the converter 750 depending on the installation requirements of the lighting device. In some embodiments, the end caps 740, 745 could be configured to not require a converter. For example, the LED lighting device 700 could be formed with end caps that mount in R17D sockets (without conductive pins, but rather with wires connecting the contacts to the converters 742, 744. In some embodiments, the end caps 740, 745 could be provided with a single Fa8 single pin configuration. The end caps 740, 745 may be formed with a plurality of vent holes 726 which allow heat dissipation from the operation of the LED lighting device 700.

Figure 8:
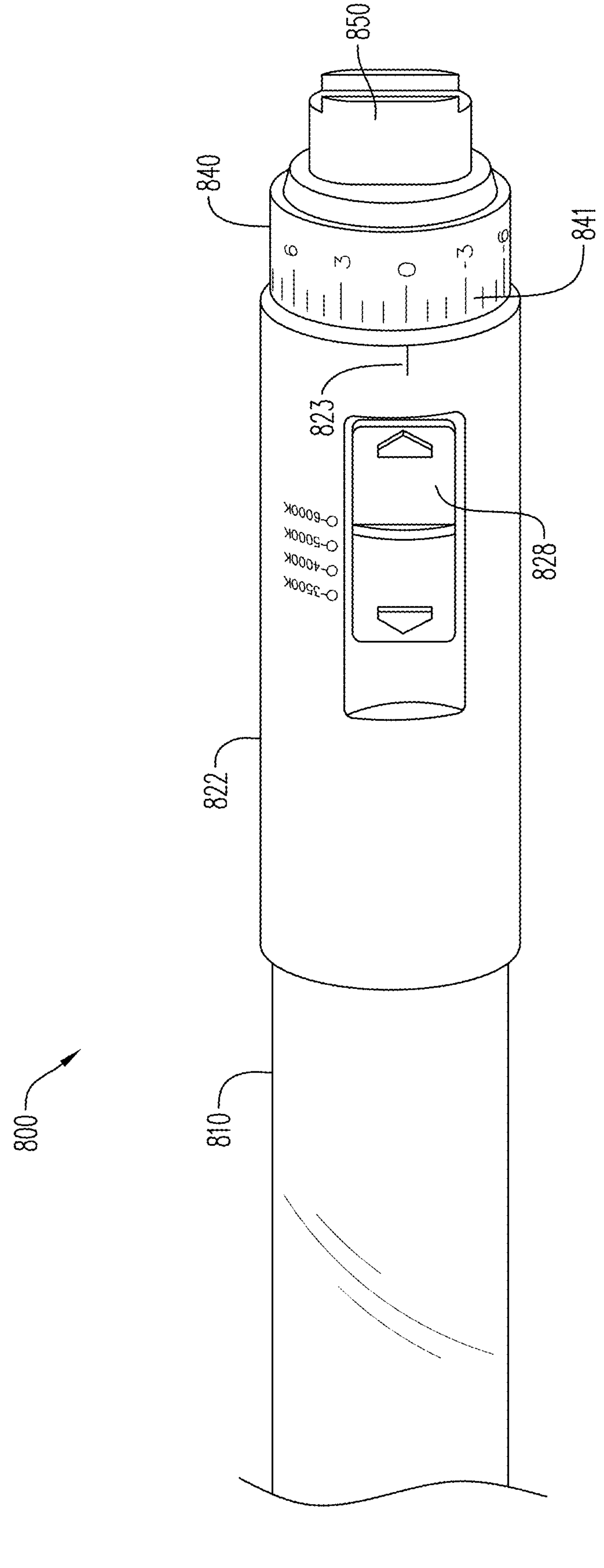
FIG. 8 illustrates a partial perspective view of an LED lighting device pursuant to some embodiments.

In the embodiment of FIG. 7 and FIG. 8, the insulating sleeve 722 is formed with a switch aperture 746 which allows a switch 728 to be held in the insulating sleeve 722 to connect with and operate a switch (not shown) mounted on first driver 742 mounted within the insulating sleeve 722. The switch 728 may be used to select between different correlated color temperature ("CCT") modes of operation of the LED lighting device 700. For example, in some embodiments, the switch 728 may allow selection between 3500K, 4000K, 5000K and 6500K CCT output modes to allow a user or installer to select a desired color temperature level of output of the LED light sources 732. Further, because the endcaps 740, 745 are rotatable, the orientation of the connector 750 with respect to the reflective strip 734 and the LED light bar 730 may be modified by simply turning the endcaps 740, 745. This allows the LED lighting device 700 to be used in many different installation environments. One LED lighting device 700 can replace many different variations of lighting devices accommodating a variety of installations.

As shown in FIG. 7, the LED lighting device 700 includes a lamp tube 710 which has a first end mounted within the insulating sleeve 722 and which contains a reflective strip 734 and an LED light bar 730 (electrically connecting a plurality of LED light sources 732 along its length). The LED light bar 730 is electrically connected at one end to a power source through the conductive pins 724 and through a first driver 742 (which includes a switch operated by the switch 728). The first driver 742 may include a rectifier (to convert input AC received from an external power source) and a CCT selectable circuit, allowing the selective changing of the color temperature output by the LED light sources 732. The first driver 742 may also include a switch that is in mechanical (or electrical) communication with switch 728 to change the CCT mode of operation. The driver 742 may include other component to prevent leakage and to meet FCC EMI requirements. A second driver 744 is electrically connected at an opposite end of the LED light bar 730. The second driver 744 may include a main buck circuit to regulate and supply a constant current or a constant voltage appropriate for driving the LED sources 732. The lamp tube 710 has a second end mounted within insulating sleeve 721 which has a rotatable end cap 745 having conductive pins 724 that may be mounted in a converter 750.

In some embodiments, as shown in FIG. 8, the rotatable endcap 840 is marked with indicators allowing a user or installer to precisely rotate the lamp tube 810 and the insulating sleeve 822 to a desired orientation. This allows an installer to mount the LED lighting device 800 in a fixture (e.g., such as a sign or cabinet), and then position the LED light bar and reflective strip in a desired orientation to adjust the lighting. In the embodiment shown, the converter and rotatable endcap 840 are fixed by the socket orientation of the fixture in which they are installed, while the insulating sleeve 822 and the lamp tube 810 (as well as the insulating sleeve 822 on the distal end of the lamp tube 810, not shown in FIG. 8) are rotatable. For example, an installer may rotate the insulating sleeve 822 to a desired position (e.g., by aligning the indicators 841 on the surface of the rotatable end cap 840 with an indicator 823 on the surface of the insulating sleeve 822). The indicators 841 on the rotatable end cap 840 may indicate an orientation of the LED light bar and reflective strip. In some embodiments, the insulating sleeve 822 is glued or otherwise affixed to the lamp tube 810. In some embodiments, markings on the surface of the rotatable end cap 840 provide easy reference to the installer to aid in positioning the lamp tube 810 and insulating sleeve 822. The rotation is permitted by the use of threads on the insulating tube 822 and inside the rotatable end cap 840 (not shown in FIG. 8 but shown as item 723 in FIG. 7). In some embodiments, the switch 828 (item 728 of FIG. 7) may be configured as a slide switch allowing a user or installer to slide the switch 828 to select a desired mode of CCT operation, although other switch types may be used. Further, although a converter 850 is shown in FIG. 8, those skilled in the art will appreciate that LED lighting devices may be configured without using a converter 850.

The result is a highly flexible LED lighting device that produces a substantially uniform distribution of light and that may be adjusted to suit different installation requirements. Embodiments are particularly suited for use cases where uniform beam patterns are desired, such as in signage or cabinet installations. Embodiments that utilize rotatable endcaps allow even further adjustment of the beam pattern. Embodiments may be used with or without adapters, allowing the LED lighting device to be installed in fixtures having different socket types. In some embodiments, the LED lighting device may be provided with a CCT selection switch, allowing further customization of the color temperature output from the LED lighting device. The result is a highly customizable LED lighting device producing a substantially uniform distribution of light from a tube-style lighting device.

As used herein, the term "LED lighting device" typically will refer to the combination of an elongated light tube, LED light bar, LED light sources and reflective strip. The LED light bar and reflective strip may each be comprised of one or more segments or portions to span the length (or a portion of the length) of the elongated light tube.

As used herein, the terms "about" or "approximately" may reflect sizes, orientations, or layouts that vary only in a small relative manner, and/or in a way that does not significantly alter the operation, functionality, or structure of certain elements. For example, a range from "about 0.1 to about 1" may encompass a range such as a 0% to 5% deviation around 0.1 and a 0% to 5% deviation around 1, especially if such deviation maintains the same effect as the listed range.

As used herein, the term "rotatable end cap" is used to refer to an end cap that allows rotation of the lamp tube. Pursuant to some embodiments, the end cap itself may be fixed in a position, while the lamp tube (and other components such as the electronics held within the lamp tube and the insulating sleeve) may be rotated with respect to the rotatable end cap.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

We claim:

1. An LED lighting device, comprising:

an elongated lamp tube;

two end caps, each of the two end caps coupled to a respective end of the elongated lamp tube;

an LED light bar disposed on an inner surface of the elongated lamp tube, the LED light bar having a plurality of LED light sources mounted thereon;

a power source disposed on at least a first end of the lamp tube, the power source electrically connected to the plurality of LED light sources; and a reflective strip disposed on the inner surface of the elongated lamp tube in a position diametrically opposite the LED light bar.

2. The LED lighting device of claim 1, wherein the reflective strip has a width approximately equal to or greater than 80% of the width of the LED light bar.

3. The LED lighting device of claim 2, wherein the reflective strip has a reflectivity of greater than 80% on a surface of the reflective strip facing the LED light bar.

4. The LED lighting device of claim 2, wherein the reflective strip has a thickness of approximately equal to or greater than 0.05 mm.

5. The LED lighting device of claim 1, wherein the reflective strip has a width of approximately 10 mm and the LED light bar has a width of approximately 9.5 mm.

6. The LED lighting device of claim 1, wherein the width of the reflective strip is based at least in part on the reflectivity of the reflective strip and the width of the LED light bar.

7. The LED lighting device of claim 1, wherein at least one of the two end caps has at least a first conductive pin, the conductive pin electrically coupling the power source with an external power supply.

8. The LED lighting device of claim 7, wherein at least one of the two end caps is a rotatable end cap allowing rotation of the elongated lamp tube with respect to the rotatable end cap.

9. The LED lighting device of claim 8, further comprising:

an insulating sleeve extending from the first end of the lamp tube to the rotatable end cap, the insulating sleeve rotatable with the elongated lamp tube with respect to the rotatable end cap.

10. The LED lighting device of claim 9, further comprising:

a plurality of indicators on a surface of the rotatable end cap, the plurality of indicators indicating a position of the elongated lamp tube with respect to the rotatable end cap.

11. The LED lighting device of claim 1, further comprising:

an insulating sleeve extending from the first end of the lamp tube to one of the end caps, the insulating sleeve holding the power source.

12. The LED lighting device of claim 11, wherein the power source includes a switch operable to select between one or modes of operation of the LED light sources, the insulating sleeve further comprising:

a switch recess; and a user switch, the user switch mounted in the switch recess and in communication with the switch.

13. The LED lighting device of claim 7, further comprising:

a connector mounted on the at least one of the two end caps having the at least first conductive pin, the connector configured to mount the LED lighting device in a high output socket.

14. The LED lighting device of claim 1, wherein the LED lighting device emits light in a substantially uniform distribution about the elongated light tube.

15. The LED lighting device of claim 7, wherein the two end caps are formed as recessed double-contact connectors.

16. An elongated LED lamp tube, comprising:

an LED light bar disposed on an inner surface of the elongated LED lamp tube, the LED light bar having a plurality of LED light sources mounted thereon;

a power source disposed on at least a first end of the lamp tube, the power source electrically connected to the plurality of LED light sources; and a reflective strip disposed on the inner surface of the elongated lamp tube in a position diametrically opposite the LED light bar.

* * * * *